United States Patent [19]

Kamaji

[11] Patent Number: 4,845,428

[45] Date of Patent: Jul. 4, 1989

[54] MAGNETIC ROTATIONAL DETECTING ARRANGEMENT FOR SENSING THE SPEED OF A RAILWAY VEHICLE

[75] Inventor: Hideo Kamaji, Tarumi, Japan

[73] Assignee: Nippon Air Brake Co., Ltd., Kobe, Japan

[21] Appl. No.: 173,203

[22] Filed: Mar. 25, 1988

[30] Foreign Application Priority Data

Mar. 31, 1987 [JP] Japan .............................. 62-49444[U]

[51] Int. Cl.$^4$ ............................................. G01P 3/487
[52] U.S. Cl. .................................... 324/174; 324/208; 246/249
[58] Field of Search ............... 324/173, 174, 162, 207, 324/208, 217, 262; 246/249; 340/870.31; 361/236, 240; 303/105; 73/517 R, 517 A, 518, 519

[56] References Cited

U.S. PATENT DOCUMENTS 3,742,243  6/1973  Gamble ........................... 324/174 X
4,024,458  5/1977  Templin .......................... 324/208 X
4,629,982 12/1986  Kieslich ............................ 324/208

FOREIGN PATENT DOCUMENTS 59-6445  2/1984  Japan .

Primary Examiner—Reinhard J. Eisenzopf
Assistant Examiner—Jack B. Harvey
Attorney, Agent, or Firm—J. B. Sotak

[57] ABSTRACT

A magnetic speed detecting arrangement for a railway vehicle including a number of permanent magnets fixed on the outer circumference of an axle of the railway vehicle at fixed intervals in which the distance between two adjacent permanent magnets is larger than the width of the permanent magnets. A detector holder is fixed to the sprung portion of the body of the railway vehicle. A number of magnetic sensing elements are mounted to the detector holder and face the outer circumference of the axle. The number of permanent magnets may vary between 7 and 17 and the number of magnetic sensing elements may vary between 4 and 9 so that the product of the permanent magnets and magnetic sensing elements causes the detector to produce at least 60 pulses per revolution of the axle.

14 Claims, 2 Drawing Sheets

PRIOR ART

MAGNETIC ROTATIONAL DETECTING ARRANGEMENT FOR SENSING THE SPEED OF A RAILWAY VEHICLE

FIELD OF THE INVENTION

This invention relates to rotational detection apparatus which is used to measure and test the braking characteristics of railway vehicles and, more particularly, to a magnetic speed sensing arrangement for establishing the degree of speed reduction and/or braking distance or braking time during actual operation of railway vehicles.

BACKGROUND OF THE INVENTION

One type of prior art is a rotation detection arrangement, shown and described in published Japanese Patent Application No. 59-6445. An illustrative embodiment of such a speed sensing system is explained below with reference to FIGS. 2a and 2b of the accompanying drawings.

As shown, the outer circumference of a wheel axle AX is provided with a number of permanent magnets M, which are arranged at essentially the same spaced intervals. The magnets are arranged such that they have the same polar orientation. A suitable covering material or OT cover tape is used. The circumferential distance A between adjacent permanent magnets M is greater than the width B of the magnets M, so that $A>B$. The sum of the distance A and the width B around the circumference determines the installation interval or pitch P wherein $P=(A+B)$. Magnetic head A or holder H is suitably fixed to the main body of the motor MB by a bracket B. On this holder, there is mounted magnetic detecting or sensing element GS which is spaced in relationship to the axle AX.

Since the holder H is mounted on the sprung portion of the vehicle, it fluctuates vertically as a result of the vibrational movement of the vehicle body while in motion. Thus, the distance between the magnets M and the magnetic detection element GS may vary between 20-30 mm. If the magnets M are relatively small, then the strength of the lines of magnetic flux is relatively weak. Thus, the vibrational fluctuations may result in the inability to accurately detect or sense the actual speed or rotational velocity of the axle AX. Conversely, when the magnets M are relatively large, the number of magnets that can be installed on the outside circumference of the axle AX is limited. Therefore, the width B of the permanent magnets M is generally limited to 15–30 mm. Furthermore, the diameter of axle D in railway vehicles is usually between 150-170 mm. The following table 1 illustrates the axle diameter D, the distance A between adjacent magnets, the width B of the magnets, the mounting interval or pitch P, and the maximum number of magnets which may be installed on the circumference of wheel axle to effectively and efficiently detect the rotational speed of a moving vehicle.

TABLE 1

| Axle Diameter D (mm) | Distance Between Magnets A (mm) | Width of Magnets B (mm) | Magnet Pitch P (mm) | Maximum Number of Magnets |
|---|---|---|---|---|
| 150 | 16.4 | 15 | 31.4 | 15 |
|  | 37.3 | 30 | 67.3 | 7 |
| 160 | 16.4 | 15 | 31.4 | 16 |
|  | 32.9 | 30 | 62.9 | 8 |
| 170 | 16.4 | 15 | 31.4 | 17 |
|  | 36.8 | 30 | 66.8 | 8 |

As shown in Table 1, a conventional-type of rotational detection arrangement is only capable of efficaciously accommodating between 7 and 17 magnets, depending on the axle diameter D and the width B of the magnets M.

Therefore, in such conventional-type of magnetic speed detectors, as described above, there will be 7 to 17 pulses generated for each revolution of the axle AX. These pulses are then fed to a suitable pulse measuring instrument PM. The pulses are amplified and shaped to a desired wave form, such as, square-wave pulses. The square-wave pulses are fed to a digital-to-analog converter for conversion to a speed signal which is displayed on the console or like in the cab or compartment of the operator of the railway vehicle or train.

In such a conventional speed detection system, the number of pulses obtainable during one rotation of axle AX is limited to 7 to 17. One of the problems with such a system is that the resolution and accuracy of the speed determination on such limited data is relatively poor.

As a result of various studies of this problem, it was discovered that, in order to increase the resolution and accuracy of the speed measurements to a sufficiently acceptable level, it was necessary to generate sixty (60) or more pulses per revolution of the axle AX.

OBJECTS AND SUMMARY OF THE INVENTION

Therefore, a new and unique technical approach has been taken in this invention to solve the above-noted problem. The novel rotation detection apparatus is used for testing brake characteristics in which there are 7 to 17 permanent magnets fixed on the outside circumference of the axle of railroad vehicles at fixed intervals. In practice, the distance between adjacent permanent magnets is larger than the width of magnets along the circumferential direction. A mounting bracket is fixed to the body of the railway vehicle facing the axle. A magnetic detecting head is fastened to the mounting bracket in such a manner that it is oriented to face the outer peripheral surface of the axle. The head includes a plurality of electromagnetic sensing or detecting elements mounted in the surface facing the axle.

When there are seven (7) permanent magnets mounted on the axle, magnetic detection member includes nine (9) individual sensing elements. When the number of permanent magnets is increased, the number of magnetic sensing elements is decreased. When there are seventeen (17) permanent magnets, the number of magnetic sensing elements is no more than four (4). The magnetic sensing elements are placed in a line in the face facing the peripheral surface of the axle. These magnetic sensing elements are arranged at approximately equal intervals or distances around the circumference of the axle on the mounting head. The center-to-center distance between the magnetic sensing elements at both ends is set to be smaller than the above mounting interval of the permanent magnets on the axle.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 2b is an enlarged schematic representation of the speed detect of FIG. 2a.

DETAILED DESCRIPTION OF THE INVENTION

Figure 1A:
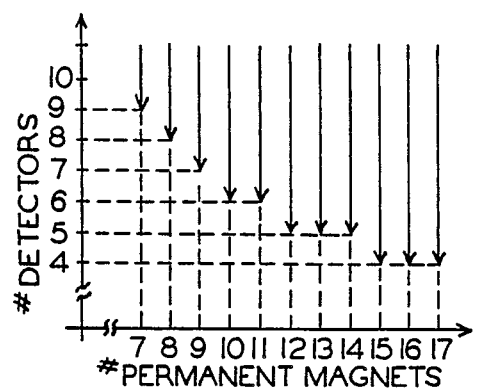
FIG. 1a is a line graph showing the number of magnetic detecting or sensing elements (ordinate) versus the number of permanent magnets (abscissas) of the present invention.
Figure 1C:
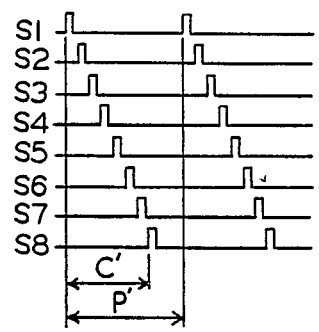
FIG. 1c is a pulse chart showing the electric pulses produced by the eight sensing elements mounted in the magnetic head during the movement of the axle through an angle to the pitch of the permanent magnets as shown in FIG. 1b.
Figure 1B:
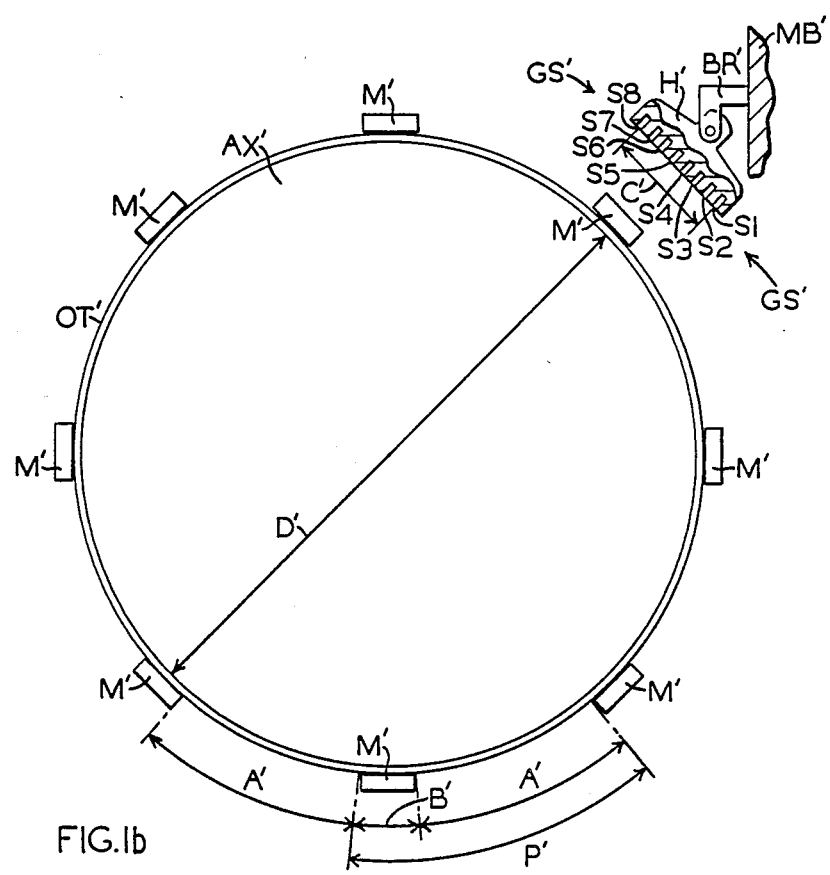
FIG. 1b is a schematic representation of one embodiment of an arrangement for implementing the present invention.
Figure 2A:
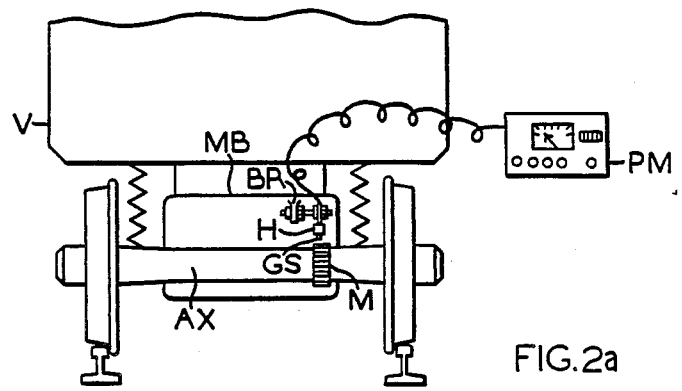
FIG. 2a is a schematic illustration of a railway vehicle having an axle speed detecting embodiment according to the prior art.

Referring now to the drawings, and in particular to FIG. 1b, there is shown a schematic diagram of a magnetic detecting arrangement having eight (8) equally spaced permanent magnets M' mounted on the peripheral surface of a railway vehicle axle AX' by suitable binding tape OT' and having eight (8) magnetic detecting or sensing elements S1, S2, S3, S4, S5, S6, S7, and S8 mounted in head H' which is connected to bracket B'. The bracket B' is secured to the housing of motor MB of the railway vehicle, such as, vehicle V shown in FIG. 2a.

In viewing FIG. 1a, it will be seen that the number of magnetic detecting elements which are arranged and held in the circumferential direction in the mounting head H' are compared to the number of permanent magnets M' which are fixed around the circumference of axle AX'.

It will be appreciated that the diameter D' of the axle AX' of the railway vehicle may vary between 150 to 170 mm. The circumference width B' of the magnets M' may be between 15 to 30 mm. The distance A' between the adjacent facing edges of the magnets M' may vary from 16.4 to 37.3 mm. The pitch P' of the magnets M' is between 31.4 mm and 67.3 mm. In practice, the number of magnets M' located around the periphery of the axle AX' is dependent upon axle diameter and accuracy required.

In viewing FIG. 1a, it will be seen that, when there are seven (7) permanent magnets M' fixed on axle AX', it is practical to mount nine (9) magnetic detection elements in the head H' to produce sixty-three (63) pulses per axial revolution. In examining the line graph of FIG. 1a, if one utilizes eight (8) magnets and eight (8) sensing elements, then sixty-four (64) pulses are generated per axle revolution. The use of nine (9) permanent magnets M' and seven (7) sensing elements results in sixty-three (63) pulses per axle rotation. In practice, ten (10) or eleven (11) permanent magnets M' may be used in conjunction with six (6) sensing elements to obtain sixty (60) and sixty-six (66) pulses for every resolution of the axle AX'. Only five (5) detecting elements are necessary with 12, 13, and 14 permanent magnets in order to generate sixty (60), sixty-five (65), and seventy (70) pulses, respectively, per axle rotation. Thus, more than sixty (60) pulses can be obtained for each revolution of axle AX' by employing an X number, namely, four (4) to nine (9) magnetic sensing elements in combination with a Y number, namely, seven (7) to ten (10) permanent magnets M'.

Furthermore, the requirement is that the maximum number of magnetic detection elements is determined so that the distance between the centers of magnetic detection elements at both ends in the circumferential direction of the holder does not exceed the mounting pitch distance P'. This is necessary in order to avoid the simultaneous sensing of adjacent permanent magnets.

Figure 2B:
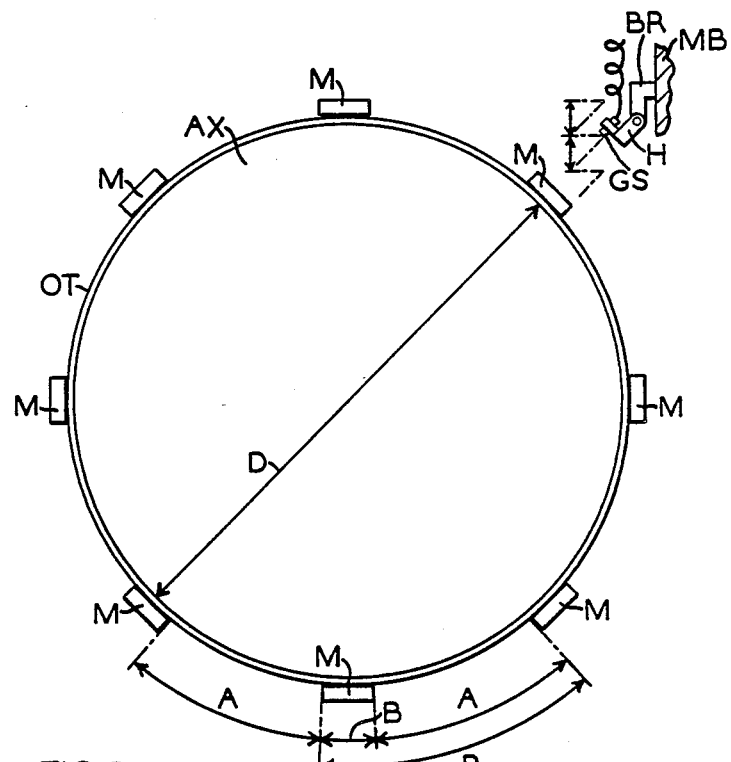

As previously noted, FIG. 1b illustrates one embodiment of the invention in which there are eight (8) permanent magnets M' and in which the magnetic detector GS' includes eight (8) magnetic sensing elements S1–S8. The distance between the centers C' of the elements S1 and S8 from end to end is less than the distance of the pitch P'. The characters in FIG. 1b are primed and are identical to those used in FIG. 2b.

It will be seen that FIG. 1c shows the sequence of the output signal pulses produced by each of the magnetic sensing elements S1–S8 of the magnetic detector GS' illustrated of FIG. 1b in which the axle is rotating in a counterclockwise direction. These are electrical pulses which are amplified and shaped in a counterclockwise direction. In viewing FIG. 1c, it will be appreciated that the time P' is the time it takes to sense one permanent magnet M' by the magnetic sensing element S1 to the sensing of the next permanent magnet M' which corresponds to the above-noted pitch P'. Also, the time C' in which a particular permanent magnet M' is sensed by the first magnetic sensing element S1 to the time when the eighth magnetic sensing element S8, by this particular magnetic M', corresponds to the above-noted distance C' between the centers of the sensing elements S1–S8.

In the particular embodiment shown in FIG. 1b, there are sixty-four (64) pulses produced during each rotation of axle AX'.

It will be seen that the forward face of the holder or head H' is illustrated as being flat; however, it will be understood that the face may be curved to conform with the arc of the outside circumference of the axle AX'. Under the latter arrangement, each of the magnetic sensing element S1–S8 faces and is directed toward the center of the axle AX'. Also, the shape of the holder H' as well as its mounting position on the vehicle may be varied in accordance with the desired needs of a particular operation. Furthermore, it is understood that the selected number of permanent magnets and the associated magnetic sensing elements is a matter of choice which is dependent upon the particulars of any given application.

Since at least sixty (60) pulses can be obtained for each rotation of the axle AX' by employing the subject invention, it is apparent that the degree of accuracy in measuring the actual speed of the vehicle to optimize the testing of braking characteristics is improved and enhanced.

Also, by selecting sixty (60) pulses per axle rotation, it is possible to coordinate the pulses for speedometer of the vehicles which is normally sixty to ninety (60–90) pulses per rotation. Thus, the loss of a pulse or two or more pulses per revolution of the axle does not materially affect the accuracy of the speed measurements of the railway vehicle. Accordingly, the normal vibrations and undulations of the railway vehicle have a minimal effect on the speed measurements due to the large number of pulses which are generated by the subject detection arrangement.

The following is a list of the items or components shown in FIGS. 1a, 1b, and 1c.

AX'—axle
M'—permanent magnet
H'—holder or head
GS'
(S1–S8)—magnetic detector and sensing elements
A'—distance between adjacent magnets
B'—width of magnets in circumferential direction
C'—distance between centers of the sensing element
P'—pitch of the magnets Thus, the present invention has been described in such full, clear, concise, and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

I claim:

1. A rotation detecting device for testing brake characteristics of a railway vehicle comprising, a number of permanent magnets fixed to the outer circumference of an axle of the railway vehicle at fixed intervals in which the distance between two adjacent permanent magnets is larger than the width of the permanent magnets, a detector is fixed on the railway vehicle, a number of magnetic sensing elements mounted to the detector and facing the outer circumference of the axle, the magnetic sensing elements are arranged approximately at equal intervals on the detector in a straight line so that the distance between the centers of the end magnetic sensing elements is smaller than the fixed intervals of the permanent magnets, and wherein Y represents the number of permanent magnets and X represents the number of magnetic sensing elements so that the product of X times Y will result in at least 60 pulses to be produced by the detector for each revolution of the axle.

2. The rotation detecting device as defined in claim 1, wherein X includes from 4 to 9 magnetic sensing elements.

3. The rotation detecting device as defined in claim 2, wherein Y includes from 7 to 17 permanent magnets.

4. The rotation detecting device as defined in claim 3, wherein when X is 4 and Y is 17 so that the detector produces 68 pulses per revolution of axle.

5. The rotation detecting device as defined in claim 3, wherein when X is 4 and Y is 16 so that the detector produces 64 pulses per revolution of the axle.

6. The rotation detecting device as defined in claim 3, wherein when X is 4 and Y is 15 so that the detector produces 60 pulses per revolution of the axle.

7. The rotation detecting device as defined in claim 3, wherein when X is 5 and Y is 14 so that the detector produces 70 pulses per revolution of the axle.

8. The rotation detecting device as defined in claim 3, wherein when X is 5 and Y is 13 so that the detector produces 65 pulses per revolution of axle.

9. The rotation detecting device as defined in claim 3, wherein when X is 5 and Y is 12 so that the detector produces 60 pulses per revolution of the axle.

10. The rotation detecting device as defined in claim 3, wherein when X is 6 and Y is 11 so that the detector produces 66 pulses per revolution of the axle.

11. The rotation detecting device as defined in claim 3, wherein when X is 6 and Y is 10 so that the detector produces 60 pulses per revolution of the axle.

12. The rotation detecting device as defined in claim 3, wherein when X is 7 and Y is 9 so that the detector produces 63 pulses per revolution of the axle.

13. The rotation detecting device as defined in claim 3, wherein when X is 8 and Y is 8 so that the detector produces 64 pulses per revolution of the axle.

14. The rotation detecting device as defined in claim 3, wherein when X is 9 and Y is 7 so that the detector produces 63 pulses per revolution of the axle.

* * * * *